US010990938B2

(12) United States Patent
Gabriel et al.

(10) Patent No.: US 10,990,938 B2
(45) Date of Patent: Apr. 27, 2021

(54) METHODS AND SYSTEMS FOR IMPLEMENTING DYNAMIC BILLING

(71) Applicant: John Hancock Life Insurance Company (U.S.A.), Boston, MA (US)

(72) Inventors: Matthew F. Gabriel, Boston, MA (US); James J. Bowman, Boston, MA (US); Neal P. Kerins, Boston, MA (US)

(73) Assignee: John Hancock Life Insurance Company (U.S.A.), Boston, MA (US)

(*) Notice: Subject to any disclaimer, the term of this patent is extended or adjusted under 35 U.S.C. 154(b) by 212 days.

(21) Appl. No.: 14/944,166

(22) Filed: Nov. 17, 2015

(65) Prior Publication Data

US 2016/0140522 A1    May 19, 2016

Related U.S. Application Data

(60) Provisional application No. 62/080,931, filed on Nov. 17, 2014.

(51) Int. Cl.
*G06Q 20/10* (2012.01)
*G06Q 40/08* (2012.01)
*G06Q 20/14* (2012.01)

(52) U.S. Cl.
CPC ........... *G06Q 20/102* (2013.01); *G06Q 20/14* (2013.01); *G06Q 40/08* (2013.01)

(58) Field of Classification Search
CPC ...... G06Q 40/08; G06Q 20/102; G06Q 20/14; G06Q 10/04; G06Q 30/018; G06Q 30/0601; G06Q 50/22; G06Q 20/10
See application file for complete search history.

(56) References Cited

U.S. PATENT DOCUMENTS

| 5,937,387 A | 8/1999 | Summerell et al. |
| 5,956,691 A * | 9/1999 | Powers ................... G06Q 40/08 705/4 |

(Continued)

FOREIGN PATENT DOCUMENTS

| WO | WO-0074336 A2 * | 12/2000 | ......... H04Q 11/0478 |
| WO | WO-2010062899 A1 * | 6/2010 | ............. G06Q 30/04 |
| WO | WO-2016/081521 A1 | 5/2016 | |

OTHER PUBLICATIONS

Oracle Insurance: Chart of Accounts User's Guide—Oracle Insurance Policy Administration—Life Release 8. 1, May 2009, pp. 1-34 (Year: 2009).*

(Continued)

*Primary Examiner* — Bijendra K Shrestha
(74) *Attorney, Agent, or Firm* — William R. Haulbrook; Alexander D. Augst; Choate, Hall & Stewart LLP

(57) ABSTRACT

Described herein are methods and systems for administering a life insurance policy that provide an alternative to the traditional approach by querying a client for a set of coverage objectives and using a set of algorithms to automatically adjust billed premiums on an ongoing basis to maintain the client-specified coverage objectives—a methodology referred to herein as "dynamic billing." Dynamic billing enables clients to take corrective action sooner than it would otherwise be taken and/or provides an automated mechanism or prompt for clients to take such action on an ongoing basis. For example, in certain embodiments, the disclosed technology computes adjusted premiums and allows the policy owner to be billed the amount required to keep his/her policy on track with his/her current insurance policy objectives.

10 Claims, 4 Drawing Sheets

(56) References Cited

U.S. PATENT DOCUMENTS

| | | | |
|---|---|---|---|
| 6,456,979 B1* | 9/2002 | Flagg | G06Q 40/08 705/2 |
| 6,684,190 B1* | 1/2004 | Powers | G06Q 40/06 705/36 R |
| 7,908,156 B2 | 3/2011 | Gore et al. | |
| 7,962,351 B2 | 6/2011 | LeBlanc et al. | |
| 8,041,636 B1* | 10/2011 | Hunter | G06Q 20/10 705/26.1 |
| 8,442,845 B2 | 5/2013 | LeBlanc et al. | |
| 8,515,785 B2 | 8/2013 | Clark et al. | |
| 8,543,425 B1* | 9/2013 | Hacker | G06Q 40/08 705/35 |
| 8,930,269 B2* | 1/2015 | He | B60K 28/06 705/39 |
| 10,055,792 B2* | 8/2018 | Price | G06Q 40/00 |
| 2002/0002475 A1 | 1/2002 | Freedman et al. | |
| 2002/0198802 A1* | 12/2002 | Koresko | G06Q 40/00 705/35 |
| 2003/0078815 A1 | 4/2003 | Parsons | |
| 2004/0059609 A1* | 3/2004 | Chatlain | G06Q 40/00 705/4 |
| 2005/0102172 A1 | 5/2005 | Sirmans | |
| 2005/0228692 A1 | 10/2005 | Hodgdon | |
| 2008/0103841 A1* | 5/2008 | Lewis | G06Q 40/04 705/4 |
| 2008/0109263 A1 | 5/2008 | Clark et al. | |
| 2008/0147447 A1* | 6/2008 | Roche | G06Q 40/00 705/4 |
| 2009/0150192 A1* | 6/2009 | Gore | G06F 19/328 705/4 |
| 2009/0204446 A1 | 8/2009 | Simon et al. | |
| 2010/0145734 A1 | 6/2010 | Becerra et al. | |
| 2010/0274590 A1* | 10/2010 | Compangano | G06Q 40/08 705/3 |
| 2011/0004492 A1* | 1/2011 | Bradshaw | G06Q 40/08 705/4 |
| 2011/0077982 A1 | 3/2011 | Roscoe et al. | |
| 2012/0116822 A1* | 5/2012 | Vasavada | G06Q 40/08 705/4 |
| 2013/0035964 A1 | 2/2013 | Roscoe et al. | |
| 2013/0151283 A1 | 6/2013 | Ranicar, III et al. | |
| 2015/0039498 A1* | 2/2015 | Weiss | G06Q 20/102 705/40 |
| 2015/0134344 A1 | 5/2015 | Turrentine et al. | |

OTHER PUBLICATIONS

Resource Insurance Consultants (RIC): Inforce Life Insurance Policy Review, Jun. 30, 2013, Life Track Advisor, pp. 1-9. (Year: 2013).*

International Search Report, PCT/US15/61192, 3 pages, dated Feb. 12, 2016.

Written Opinion, PCT/US15/61192, 11 pages, dated Feb. 12, 2016.

* cited by examiner

METHODS AND SYSTEMS FOR IMPLEMENTING DYNAMIC BILLING

RELATED APPLICATIONS

The present application claims the benefit of U.S. Provisional Patent Application Ser. No. 62/080,931, filed Nov. 17, 2014, the content of which is incorporated by reference herein in its entirety.

BACKGROUND OF THE INVENTION

Life insurance policies are designed to pay a death benefit upon the death of the insured. There are generally two types of life insurance policies—term life insurance and permanent life insurance. Term life insurance provides death benefit protection for a specific period of time. Permanent life insurance offers lifetime death benefit protection with a cash value component. Examples of permanent life insurance include traditional universal life insurance, indexed universal life insurance, and variable universal life insurance.

Traditional universal life insurance is permanent insurance that provides lifetime death benefit protection and cash value accumulation potential. Such policies may allow the amount and frequency of premium payments to be adjusted within certain limits. The policy account value grows based on a credited interest rate that can change. Money may be accessed from the policy via withdrawals and loans; however, this decreases the cash value and/or death benefit unless repaid. There may be certain tax advantages provided by these policies.

Indexed universal life is a type of permanent life insurance that offers the same features as traditional universal life but with an opportunity to earn interest linked to the performance of an indexed account, such as the S&P 500, for example, while protecting the policy's cash value from market risk. Premium allocation options may be flexible, allowing the policy holder to switch between various allocation options over the lifetime of the policy. Indexed universal life policies generally have more cash value accumulation potential than other universal life policies.

Variable universal life insurance is permanent insurance that provides lifetime death benefit protection, flexible premium payments, and the ability to build cash value. For example, the policy holder may accumulate cash value by choosing from a variety of investment options across a range of risk categories. The policy account value varies depending on the performance of the investment options selected. Funds may be transferred among different investment options over the lifetime of the policy.

SUMMARY OF THE INVENTION

Flexible premium products, such as universal life, variable universal life, and indexed universal life, have planned premiums based on an initial set of assumptions at the time of purchase of the policy. The planned premiums are rarely changed post issue, and the policy owner may not realize his/her premiums no longer meet his/her insurance coverage objectives. Policy assumptions can change after a policy is issued, and it is up to the client to change his/her policy to remain on track with the original objectives. Otherwise, the fixed premium policy may no longer be satisfactory to achieve the policyholder's desired/original coverage objectives.

Described herein are methods and systems for administering a life insurance policy that provide an alternative to the traditional approach by querying a client for a set of coverage objectives and using a set of algorithms to automatically adjust billed premiums on an ongoing basis to maintain the client-specified coverage objectives a methodology referred to herein as "dynamic billing." Dynamic billing enables clients to take corrective action sooner than it would otherwise be taken and/or provides an automated mechanism or prompt for clients to take such action on an ongoing basis. For example, in certain embodiments, the disclosed technology computes adjusted premiums and allows the policy owner to be billed the amount required to keep his/her policy on track with his/her current insurance policy objectives. This can be accomplished, for example, by resolving the premium on an annual basis taking into account various applicable policy attributes (e.g., actual policy performance, healthy engagement statuses, prior premium payments, current crediting rates, fixed account rates, capped indexed account rates, high par indexed account rates, uncapped indexed account rates, variable rates, enhanced yield fixed account rates, policy changes, and/or current policy objectives). In other embodiments, the premium is resolved in more frequent or less frequent intervals than yearly.

In certain embodiments, the insurance coverage objectives are selected by a customer with the assistance of an agent via an interactive illustration system. Policy objectives may include, for example, premium duration, target cash value, target cash value year, crediting rate, and death benefit option. The policy owner is billed variable premiums required to keep the policy 'on track' with policy funding objectives. For example, the premium may be annually re-solved taking into account actual policy performance (e.g., interest credits, premium payments, and the like), as well as current crediting rates, policy charges, and the on-file policy illustration objectives.

In one aspect, the invention is directed to a method of implementing dynamic billing for a life insurance policy, the method comprising: receiving, from an administration system, current policy in-force values associated with the life insurance policy; querying a database for dynamic billing objectives using a unique identifier associated with the life insurance policy, wherein the dynamic billing objectives comprise at least one member selected from the group consisting of: assumptions, actual policy performance, current crediting rates, policy charges, and one or more on-file policy illustration objectives specified by the policy owner; determining a recalculated premium based at least in part on the dynamic billing objectives; and providing, to the administration system, (e.g., for communication to the policy owner) the recalculated premium (e.g., wherein the recalculated premium overwrites the planned premium in the administration system).

In certain embodiments, the current policy in-force values comprise a wellness status. In certain embodiments, actual policy performance comprises at least one member selected from the group consisting of interest credits, wellness statuses achieved, and premium payments. In certain embodiments, actual policy performance comprises at least one member selected from the group consisting of interest credits and premium payments.

In certain embodiments, the one or more on-file policy illustration objectives specified by the policy owner comprise at least one member selected from the group consisting of: desired premium duration, target cash value, target cash value year, crediting rate, death benefit option, and any other illustrated policy goals.

In another aspect, the invention is directed to a dynamic billing system for managing billing of a life insurance policy, the system comprising: an administration system configured to receive current policy in-force values associated with the life insurance policy; a database storing dynamic billing objectives using a unique identifier associated with the life insurance policy, wherein the dynamic billing objectives comprises at least one member selected from the group consisting of: assumptions, actual policy performance, current crediting rates, policy charges, and one or more on-file policy illustration objectives specified by the policy owner; and an illustrator system configured to: query a database for dynamic billing factors using the unique identifier associated with the life insurance policy, determine a recalculated premium based at least in part on dynamic billing objectives, and provide, to the administration system, the recalculated premium (e.g., for communication to the policy owner) (e.g., wherein the recalculated premium overwrites the planned premium in the administration system).

In certain embodiments, the current policy in-force values comprise a wellness status. In certain embodiments, actual policy performance comprises at least one member selected from the group consisting of interest credits, wellness statuses achieved, and premium payments. In certain embodiments, actual policy performance comprises at least one member selected from the group consisting of interest credits and premium payments.

In certain embodiments, the one or more on-file policy illustration objectives specified by the policy owner comprise at least one member selected from the group consisting of: desired premium duration, target cash value, target cash value year, crediting rate, death benefit option, and any other illustrated policy goals.

In one aspect, the disclosed technology includes a method of implementing dynamic billing for a life insurance policy, the method including: receiving, from an administration system, current policy in-force values associated with the life insurance policy; querying a database for dynamic billing objectives using a unique identifier associated with the life insurance policy, wherein the dynamic billing objectives comprise at least one member selected from the group consisting of: assumptions, actual policy performance, current crediting rates, policy charges, and one or more on-file policy illustration objectives specified by the policy owner; determining (e.g., on each policy anniversary) a recalculated premium based at least in part on the dynamic billing objectives; and providing, to the administration system, (e.g., for communication to the policy owner) the recalculated premium (e.g., wherein the recalculated premium overwrites the planned premium in the administration system).

In certain embodiments, the current policy in-force values comprise a wellness status.

In certain embodiments, actual policy performance comprises at least one member selected from the group consisting of interest credits, wellness statuses achieved, policy charges, policy credits, timing of premiums paid, amount of premiums paid, fund performance (e.g., wherein the life insurance policy is a variable universal life policy or an indexed universal life policy), premium payments, rider terminations, distributions, death benefit increase, and death benefit decrease (e.g., and other non-guaranteed elements and/or contractual changes (wherein non-guaranteed elements are elements within the life insurance policy that affect policyholder costs or values, and that may be changed at the discretion of the insurer after issue; wherein non-guaranteed elements comprise crediting rates (above guaranteed minimums), mortality charges (below guaranteed maximums), certain expense charges, persistency credits and bonuses, and participation rates for indexed products)).

In certain embodiments, actual policy performance comprises at least one member selected from the group consisting of interest credits and premium payments.

In certain embodiments, the one or more on-file policy illustration objectives specified by the policy owner comprise at least one member selected from the group consisting of: desired premium duration, target cash value, target cash value year, crediting rate, death benefit option, contractual changes, distributions, non-guaranteed elements (wherein non-guaranteed elements are elements within the life insurance policy that affect policyholder costs or values, and that may be changed at the discretion of the insurer after issue; wherein non-guaranteed elements comprise crediting rates (above guaranteed minimums), mortality charges (below guaranteed maximums), certain expense charges, persistency credits and bonuses, and participation rates for indexed products), and any other illustrated policy goals.

In another aspect, the disclosed technology includes a dynamic billing system for managing billing of a life insurance policy, the system including: an administration system configured to receive current policy in-force values associated with the life insurance policy; a database storing dynamic billing objectives using a unique identifier associated with the life insurance policy, wherein the dynamic billing objectives comprises at least one member selected from the group consisting of: assumptions, actual policy performance, current crediting rates, policy charges, and one or more on-file policy illustration objectives specified by the policy owner; and an illustrator system configured to: query a database for dynamic billing factors using the unique identifier associated with the life insurance policy, determine (e.g., on each policy anniversary) a recalculated premium based at least in part on dynamic billing objectives, and provide, to the administration system, the recalculated premium (e.g., for communication to the policy owner) (e.g., wherein the recalculated premium overwrites the planned premium in the administration system).

In certain embodiments, the current policy in-force values comprise a wellness status.

In certain embodiments, actual policy performance comprises at least one member selected from the group consisting of interest credits, wellness statuses achieved, policy charges, policy credits, timing of premiums paid, amount of premiums paid, fund performance (e.g., wherein the life insurance policy is a variable universal life policy or an indexed universal life policy), premium payments, rider terminations, distributions, death benefit increase, and death benefit decrease (e.g., and other non-guaranteed elements and/or contractual changes).

In certain embodiments, actual policy performance comprises at least one member selected from the group consisting of interest credits and premium payments.

In certain embodiments, the one or more on-file policy illustration objectives specified by the policy owner comprise at least one member selected from the group consisting of: desired premium duration, target cash value, target cash value year, crediting rate, death benefit option, contractual changes, distributions, non-guaranteed elements, and any other illustrated policy goals.

In another aspect, the disclosed technology includes a method for dynamic policy management of a life insurance policy, the method includes: receiving, by a processor of a computing device, (e.g., at the point of sale) a plurality of objectives for the life insurance policy and a plurality of assumptions that will be used to track progress toward the goals; storing the plurality of objectives and assumptions so that they can be accessed by administrative and illustration systems used to support the products; and accessing, by the processor, the plurality of objectives on a regular and/or ad-hoc basis and providing one or more updates to the policyholder (e.g., on an ongoing basis).

In certain embodiments, the update is provided online, by mail, by email, and/or by a digital portal that can be accessed by the customer.

In certain embodiments, the update comprises at least one of a policy statement, a bill, and a notice.

In certain embodiments, the plurality of objectives comprises at least one of: pay premiums for n years to maintain coverage for lifetime, achieve a specified Policy Value at a specified year, and withdraw a specified amount of Policy Value at for a specified time period.

In certain embodiments, the plurality of assumptions comprises at least one of: number of years to pay premium, amount of premium payments, assumed policy interest rate, assumed equity return, assumed loan rate, assumed scale of insurance charges, contractual changes, distributions, non-guaranteed elements (wherein non-guaranteed elements are elements within the life insurance policy that affect policyholder costs or values, and that may be changed at the discretion of the insurer after issue; wherein non-guaranteed elements comprise crediting rates (above guaranteed minimums), mortality charges (below guaranteed maximums), certain expense charges, persistency credits and bonuses, and participation rates for indexed products), and status used to determine size of wellness or other policy credit.

In certain embodiments, the one or more updates comprises at least one of: an indication of how the policy is tracking toward the plurality of objectives based on the most current policy information and updated assumptions for the future, and actions the policyholder can take (e.g., changing the amount of premium, changing their Status) to remain on track with their insurance goals.

In another aspect, the disclosed technology is a method of implementing dynamic billing for a life insurance policy such that a premium for an insurance policy is adjusted annually to equal the amount necessary to achieve specified insurance goals; the method including: receiving, by a processor of a computing device, (e.g., at the point of sale) a plurality of insurance goals and a plurality of insurance assumptions; storing, by the processor, in a database accessible by illustration and administrative systems, the insurance goals and insurance assumptions; and determining a dynamic billing premium (e.g., on each policy anniversary) for an upcoming premium notice based at least in part on the stored insurance goals and insurance assumptions.

In certain embodiments, the method includes, prior to determining the dynamic billing premium, determining a projected dynamic billing premium at a current status for an upcoming premium notice based at least in part on the stored insurance goals and insurance assumptions (e.g., as well as updated and/or projected assumptions).

In certain embodiments, the method includes, prior to determining the dynamic billing premium, determining an alternative projected dynamic billing premium at one or more alternative statuses for an upcoming premium notice based at least in part on the stored insurance goals and insurance assumptions.

In certain embodiments, the method includes, after determining the projected dynamic billing premium, notifying the policyholder (e.g., via an email) of the projected dynamic billing premium and the alternative projected dynamic billing premium.

In certain embodiments, the projected dynamic billing premium is determined at least 30, 40, 60, or 80 days before the policy anniversary.

In certain embodiments, the method includes generating and providing to the policyholder (e.g., at or after each policy anniversary) an annual report that compares the current and previous year's dynamic billing premium and outlines the reasons for any changes.

In certain embodiments, the method includes receiving, by the processor, an adjustment to at least one of the plurality of insurance goals and the plurality of insurance assumptions; and updating, by the processor, at least one of the plurality of insurance goals and the plurality of insurance assumptions stored in the database based on the adjustment.

In certain embodiments, the plurality of insurance goals comprise at least one of: a number of years to pay premiums, a specified cash value at a specified year, contractual changes, distributions, non-guaranteed elements (wherein non-guaranteed elements are elements within the life insurance policy that affect policyholder costs or values, and that may be changed at the discretion of the insurer after issue; wherein non-guaranteed elements comprise crediting rates (above guaranteed minimums), mortality charges (below guaranteed maximums), certain expense charges, persistency credits and bonuses, and participation rates for indexed products), and a duration of insurance coverage desired.

In certain embodiments, the plurality of insurance assumptions comprises at least one of: an assumed interest crediting rate, indexed account rate, or equity return, an assumed Status, and an assumed scale of policy charges.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
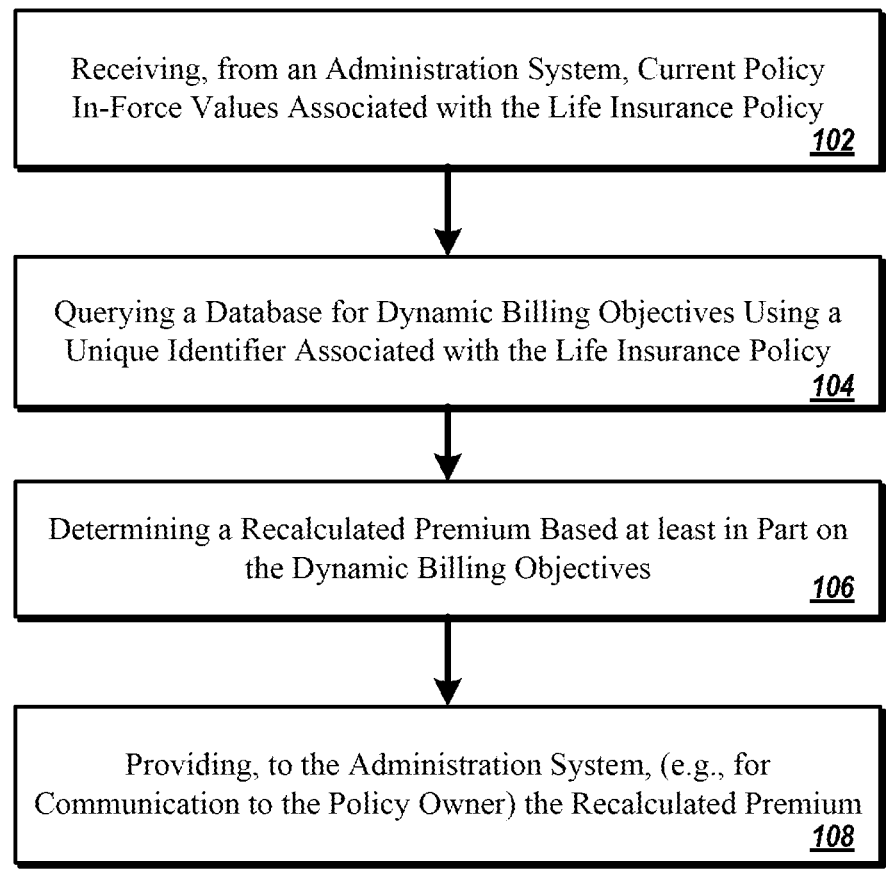
FIG. 1 is a block flow diagram of a method of implementing dynamic billing for a life insurance policy, according to an illustrative embodiment of the invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Flexible premium products such as universal life, variable universal life, and indexed universal life have planned premiums based on an initial set of assumptions. The planned premiums are rarely changed post issue, such that the policy owner may not realize his/her premiums no longer meet his/her insurance coverage objectives. The disclosed technology, in certain embodiments, provides methods and systems for administering a life insurance policy that provide an alternative to the traditional approach by asking a client for a set of coverage objectives, and adjusting billed premiums accordingly, referred to herein as "dynamic billing." In certain embodiments, dynamic billing prompts clients to take corrective action sooner than it would otherwise be taken. In some implementations, dynamic billing will bill the policy owner the amount required to keep their policy 'on track' with their on-file policy funding objectives (as opposed to their "planned premium"). This is accomplished by annually (or at other frequencies) re-solving for premium taking into account actual policy performance (e.g. interest credits, wellness statuses achieved, premium payments, etc.), current crediting rates, policy charges, and the on-file policy illustration objectives.

In certain embodiments, dynamic billing is a method for adjusting a policy's premium each year so that the billed premium will equal the amount necessary to achieve specified insurance goals, based on insurance assumptions and the most current policy experience. Insurance goals, such as a number of years to pay premiums, a specified cash value at a specified year, and the duration of insurance coverage desired, are identified at the time of sale (and/or point of sale). Additionally, insurance assumptions may be identified at the time of sale (and/or point of sale) as well, such as an assumed interest crediting rate, indexed account rate, or equity return, an assumed Status, and an assumed scale of policy charges. The insurance goals and insurance assumptions are stored in a database accessible by illustration and administrative systems.

In one example, prior to each policy anniversary, (e.g., 60 days prior), the insurance goals and insurance assumptions are fetched from the database and a projected dynamic billing premium for the upcoming premium notice is calculated. The policyholder is notified (e.g., with an email) with the projected dynamic billing premium at the current status and alternative statuses.

Additionally, later, but still prior to the policy anniversary (e.g., 28 days before the policy anniversary), the policyholder may be sent a premium notice with the dynamic billing premium. At the policy anniversary, the policyholder may be sent an annual report that compares the current and previous year's dynamic billing premium and outlines the reasons for any changes. On an ongoing basis, policyholders can modify their insurance goals and/or insurance assumptions, and/or add/remove this service from their policies. Additionally, on an ongoing basis, policyholders and their insurance advisors may access the policyholder's insurance goals, insurance assumptions, and dynamic billing premiums. This allows policyholders to keep their policy on track with their goals.

The dynamic billing and management methods are primarily described herein with respect to life insurance policies with flexible (e.g. adjustable) premiums. For example, an insurance premium is updated to remain on track with respect to one or more policy goals, e.g., providing a given death benefit and/or policy value at a specified time in the future, adjusted or non-adjusted for inflation. However, the scope of the methods described herein encompasses the management of other products as well, for example, retirement products (e.g., IRAs, 401k plans, and/or other retirement plans). For example, a customer may identify an initial investment objective such as a specific account value achieved by a specific time, and contributions are adjusted on an ongoing basis, according to the specified and updated assumptions. The methods may also be applied to the management of gifts, trusts, and/or other estate planning products.

FIG. 1 is a block flow diagram 100 of a method of implementing dynamic billing for a life insurance policy, according to an illustrative embodiment of the invention. Step 102 is receiving, from an administration system, current policy in-force values associated with the life insurance policy of a particular policy owner. At the point of sale, a set of objectives for a life insurance policy (i.e., insurance goals) can be identified as well as the assumptions that can be used to track progress toward the goals (i.e., Insurance Assumptions). Insurance goals can include: pay premiums for n years to maintain coverage for lifetime, achieve a specified policy value at a specified year, and/or withdraw a specified amount of policy value at for a specified time period. Assumptions can include: number of years to pay premium, amount of premium payments, assumed policy interest rate, assumed equity return, assumed loan rate, assumed scale of insurance charges, and/or status used to determine size of wellness or other policy credit. The insurance goals and/or assumptions are stored in a database so that they can be accessed by administrative and illustration systems used to support the insurance products.

The insurance goals and/or assumptions are accessed on a regular and ad-hoc basis and used to provide updates to the policyholder. Step 104 is querying a database for dynamic billing objectives using a unique identifier associated with the life insurance policy of the policy owner.

After the database is queried, step 106 is determining a recalculated premium based on the dynamic billing objectives. Step 108 is providing, to the administration system (e.g., for communication to the policy owner) the recalculated premium. The administration system can then communicate the recalculated premium to the policy owner. Other updates can also be provided to the policy owner, such as how the policy is tracking toward the insurance goals based on the most current policy information and updated assumptions for the future and/or actions the policyholder can take—e.g., changing the amount of premium, changing their Status—to remain on track with their insurance goals. These updates (e.g., policy statements, bills, and notices) can be provided to the policy owner online, by mail, by email, and/or through digital portals that can be accessed by the customer and/or the customer's insurance representative.

Figure 2:
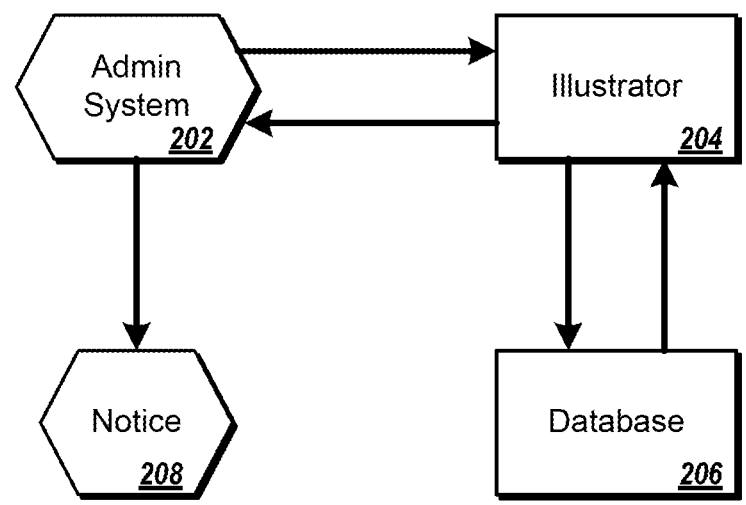
FIG. 2 is an illustration of an example system for producing a billing notice.

FIG. 2 is a schematic diagram 200 of a system for producing a billing notice according to an illustrative embodiment. In some implementations, the admin system 202 initiates its billing transaction. For policies that have elected dynamic billing, a dynamic billing premium notice must be created. In some implementations, the admin system 202 calls out to the appropriate in-force illustration calculation engine 204, providing current policy in-force values including wellness status. The illustrator 204 queries the dynamic billing objectives stored in the production database 206 using the unique identifier. Illustrator 204 resolves for the premium accordingly. Illustrator 204 sends the premium solve to the admin system 202 to produce the premium notice. The recalculated premium overwrites the planned premium in the admin system 202. The revised premium notice 208 is mailed or otherwise communicated to the customer (e.g., policy owner).

In some implementations, customers can elect dynamic billing at time of issuance of a life insurance policy, such as a universal life or term life insurance policy. In some implementations, dynamic billing is available and required on all term policies with a wellness rider. In some implementations, dynamic billing is not available on term policies without wellness rider. In some implementations, a customer may drop dynamic billing after issuance; however, this may vary based on the type of policy (e.g., a consumer can drop dynamic billing after issue for universal life, but can't drop dynamic billing after issue for term life with wellness).

Dynamic billing can be elected at issue via the illustration system. The illustration system captures the policy objectives through a series of fields. The policy objectives may include premium duration, target cash value, target cash value year, crediting rate, and death benefit option. These policy objectives are printed on a new dynamic billing disclosure form which the policy owner (e.g., the insured) is required to sign. Each policy with dynamic billing creates a unique identifier (PIN) which is used to store policy objectives, illustration inputs, and assumptions. The unique identifier is tied to illustration inputs/projections. These objectives, inputs, and assumptions are stored in a production database. The dynamic billing disclosure form and associated basic illustration pages show this unique identifier (PIN) on all pages. The unique identifier is also recorded and saved in the administration system. In some implementations, functionality only requires the unique identifier to be entered into the admin system. New in-force dynamic billing request/modification forms may be required when the policy owner wants post-issue election or post-issue policy objective changes. At time of reinstatement, a customer may be required to fill out an in-force dynamic billing request form to reaffirm policy objectives. This creates a new unique identifier (PIN) to override any existing PIN.

An agent can work with a customer to choose policy objectives through the illustration system. The dynamic billing disclosure form may be used to capture the chosen policy objectives. In some implementations, all forms show a matching unique dynamic billing PIN which is used to retrieve solve inputs. The unique dynamic billing PIN is recorded in the administration system. At the policy anniversary, administration system calls the Illustrator to re-solve the required premium to keep the policy on track. This PIN will be used to store the illustration inputs required to re-solve for the premium required to achieve on-file policy objectives. The re-solved premium overrides the existing planned premium in administration system.

In some implementations, dynamic billing is optional. This may depend on the type of life insurance product. For example, dynamic billing may be optional for protection universal life insurance policies with and without the Wellness rider (or other rider). In contrast, in some implementations, dynamic billing may be required for all term life insurance policies with wellness rider.

In some implementations, premium notices for policies with and without the wellness rider, as well as for policies without dynamic billing should have the same format. Dynamic billing may be made available for all premium modes, and recalculation of planned premium may occur annually at policy anniversary (e.g., this recalculation may occur at the time when the premium notice is generated, such as 28 days prior to anniversary date).

The following are two specific implementations of the methods described herein, provided for illustrative purposes.

Example 1 illustrates the management of a life insurance policy with a dynamic adjustment feature. First, a set of insurance goals and a set of assumptions are identified at a point of sale. The insurance goals and assumptions may include, for example, the product type, the face amount, the premium duration, the target cash value, the target cash value year, the assumed interest rate, the assumed fixed account rate, the assumed capped indexed account rate, the assumed uncapped indexed account rate, the assumed high par indexed account rate, the assumed enhanced yield fixed account rate, the assumed net variable rate of return, and/or a healthy engagement status and/or other status of the insured affecting mortality. Next, the insurance goals are stored. Then, the insurance goals are accessed on a regular and/or ad-hoc basis, and updates are provided to the policyholder to address how the policy is tracking toward insurance goals based on the most recent policy information and updated assumptions going forward, and to identify options the policyholder can select to remain on track with the originally identified insurance goals. In certain embodiments, the customer may be given the option to choose between (i) and (ii), as follows: (i) to have the identified actions automatically implemented on a regular basis, without separate confirmation by the customer each period (e.g., "auto update" of a premium amount to maintain given insurance goals every year until the customer instructs otherwise), and (ii) not to take the identified actions (the actions necessary to maintain the given insurance goals) unless the customer confirms that such actions should be taken, each period (e.g., make no changes unless and until the customer instructs, simply identify the options the policyholder can select to remain on track with the originally identified insurance goals).

Example 1—Dynamic Policy Management for Life Insurance Policies

Identify at the point of sale a set of objectives for a life insurance policy, i.e., "Insurance Goals", and the assumptions that will be used to track progress toward the goals, i.e., "Insurance Assumptions"
Insurance Goals can include:
Pay premiums for n years to maintain coverage for lifetime
Achieve a specified Policy Value at a specified year
Withdraw a specified amount of Policy Value at for a specified time period
Identify Assumptions can include:
Number of years to pay premium
Amount of premium payments
Assumed policy interest rate
Assumed equity return
Assumed loan rate
Assumed scale of insurance charges
Status used to determine size of wellness or other policy credit
Store the Insurance Goals so that they can be accessed by administrative and illustration systems used to support the products
Access the Insurance Goals on a regular and ad-hoc basis and provide updates to the policyholder about:
How the policy is tracking toward the Insurance Goals based on the most current policy information and updated assumptions for the future
Actions the policyholder can take—e.g., changing the amount of premium, changing their Status—to remain on track with their insurance goals
Provide such updates via online and/or mailed and/or emailed policy statements, bills, and notices—and through digital portals that can be accessed by the customer and/or the customer's insurance representative Example 2 illustrates a dynamic billing method for an insurance policy, e.g., a method for adjusting a policy's premium each year so that the billed premium will equal the amount necessary to achieve specified insurance goals, based on insurance assumptions and the most current policy experience. First, insurance goals are identified at the point and/or time of sale, for example, number of years to pay premiums, a specified cash value at a specified year, and/or a duration of insurance coverage desired. Also, insurance assumptions are identified at the point and/or time of sale, including an assumed interest crediting rate, indexed account rate, or equity return, an assumed status (e.g., an identified wellness status or other status of the insured affecting mortality), and/or an assumed scale of policy charges. The insurance goals and insurance assumptions are stored in a database. Then, at some time prior to the policy anniversary (e.g., 60 days), the insurance goals and assumptions are accessed and a new projected premium is computed, e.g., based on updated assumptions, to maintain the previously-identified insurance goals. Then, at a later time (e.g., 28 days prior to the policy anniversary), the policyholder is sent a premium notice with the new computed premium. On the policy anniversary, the policyholder may be sent a report that compares the current and previous year's premiums and discusses reasons for changes. In certain embodiments, the method allows policyholders to modify insurance goals and/or premiums, and/or to remove the dynamic billing service. In certain embodiments, the method allows policyholders to access their current insurance goals, insurance assumptions, and dynamic billing premiums, e.g., via a secure website.

In certain embodiments, the annual report is sent with a policy's annual statement and includes policy number, life insured name, policy owner's name, report date, premium payment amount received (if available on report generation date), policy year, premium mode, coverage objectives, premium summary, premium change explanation, a status summary section, and/or a legal disclosure section. The coverage objectives may include the selected years of coverage, the target cash value amount, the death benefit amount, an assumed crediting rate, an assumed fixed account rate, an assumed capped indexed account rate, an assumed uncapped indexed account rate, an assumed high par indexed account rate, an assumed enhanced yield fixed account rate, an assumed net variable rate of return, an assumed cost of insurance scale, and/or an assumed status. The premium summary may include the previous year's (or multiple years') premium(s), the current year's premium, and/or the amount of change of the premium. The premium change explanation may include the assumed and actual premium amounts paid, the assumed and actual crediting rate, the assumed actual fixed account rate, the assumed and actual net variable account rate, the assumed actual enhanced yield fixed account rate, any premium mode changes, any face amount changes, termination or addition of any rider, underwriting risk re-classifications, death benefit option changes, and/or assumed and earned status.

For term products, a term annual statement may include, for example, the report date, policy number, life insured's name, policy owner's name, face amount, a status achieved (e.g., a wellness status or other status of the insured affecting mortality), the policy issue date, the select period, the select period end date, the end of the convertible period, and/or the premium mode, premium details, prior year/s (or multiple years') premium(s), change in premium, this year's premium, the total amount of premium received between the premium notice date and the annual statement date, and/or future premium amounts.

Reports may be sent electronically (e.g., via email) and/or via mailed paper format. The reports may be sent to the policy owner, the life insured, and/or the servicing agent. A copy of the reports may be electronically stored.

Example 2—Dynamic Billing for a Life Insurance Policy

Identify at the point of sale, the following Insurance Goals:
  Number of years to pay premiums
  A specified cash value at a specified year
  The duration of insurance coverage desired
Identify at the point of sale, the following Insurance Assumptions:
  An assumed interest crediting rate, indexed account rate, or equity return
  An assumed Status
  An assumed scale of policy charges
Store the Insurance Goals and Insurance Assumptions in a database accessible by illustration and administrative systems
60 days prior to each policy anniversary:
  Capture the Insurance Goals and Insurance Assumptions and calculate a projected Dynamic Billing premium for the upcoming Premium Notice
  Send the policyholder an email indicating the projected Dynamic Billing premium at the current Status and alternative Statuses
28 Days prior to the anniversary
  Send the policyholder the Premium Notice with the Dynamic Billing premium
At policy anniversary
  Send the policyholder an Annual Report that compares the current and previous year's Dynamic Billing premium and outlines the reasons for any changes
On an ongoing basis:
  Allow for policyholders to modify their Insurance Goals or Insurance Assumptions, or to add or remove this service from their policies
  Allow policyholders and their insurance advisors to access their Insurance Goals, Insurance Assumptions, and Dynamic Billing premiums.

In certain embodiments, the calculation of the updated premium that would be required to maintain stated insurance goals includes a projection of future policy performance. The following is an example calculation of an updated premium, according to one embodiment.

First, the method obtains the current account value of the policy at the time the updated premium is calculated. This account value reflects the actual performance of the policy to date. Then, the method projects the account value forward according to policy performance assumptions on file (e.g., assumptions indicated by the customer), with the goal being to identify the lowest premium the customer can pay and still meet his/her policy objectives (stated insurance goals). In certain embodiments, the premium solve is performed iteratively using a "bisection solve," although other iterative techniques can be used. To illustrate, assume a 45 year old individual purchases a policy with the stated goal of achieving an account value of $1 million by age 80, and assume that at the time of the original sale, it was projected that a premium of $20,000 would be sufficient for the customer to reach his/her $1 million goal at age 80. Assume that it is now three years after the original sale, and the policy has performed better than expected (better than would be predicted from the original policy performance assumptions). The method begins with a current account value. Using a premium of $20,000, the customer's policy performance assumptions, and any assumptions regarding a healthy engagement status and/or other status of the insured affecting mortality, a predicted value of the account at age 80 is calculated. If the predicted value is greater than the $1 million goal, the prediction is performed again using a lower premium amount, say, $10,000 (one-half the original premium). Assuming the $10,000 premium results in a predicted account value that falls short of the $1 million goal at age 80, the prediction is performed again using a higher premium, say, $15,000 (midway between the previous two premiums checked). If the value predicted using $15,000 falls short of the goal, the next guess will be $17,500, and if the value predicted using $15,000 is higher than the goal, the next guess will be $12,500. The process is repeated until a premium that provides the goal is determined, using the assumptions available at the time of the calculation. Because the premium computation is performed on an ongoing basis, the assumptions and previous performance can be accounted for in the updated computed premiums, thereby assisting the customer in achieving his/her stated long term goal(s) while accounting for changes in performance and assumptions that become apparent over time.

Figure 3:
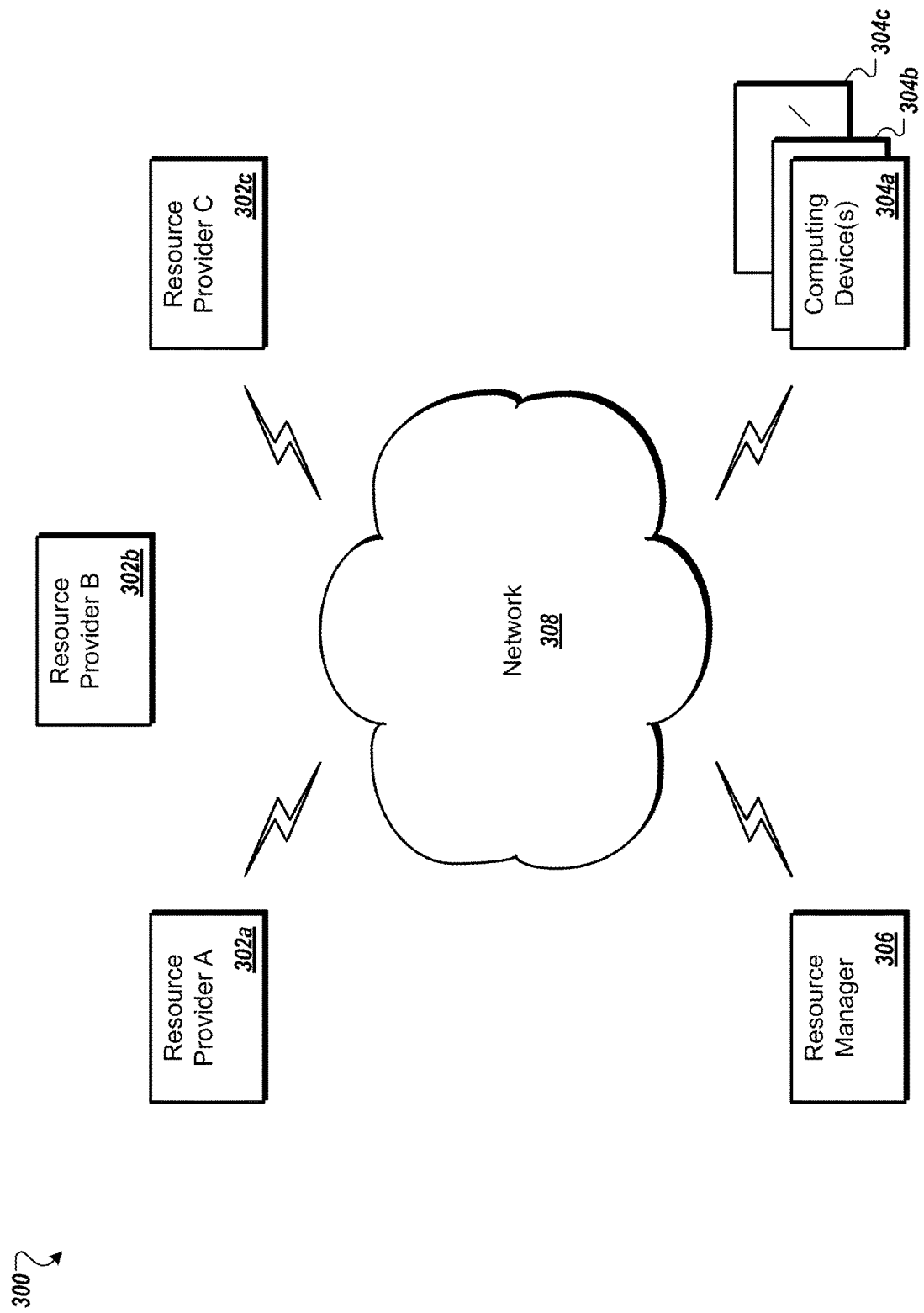
FIG. 3 shows a block diagram of an exemplary cloud computing environment.

As shown in FIG. 3, an implementation of a network environment 300 for use in implementing dynamic billing for life insurance policies is shown and described. In brief overview, referring now to FIG. 3, a block diagram of an exemplary cloud computing environment 300 is shown and described. The cloud computing environment 300 may include one or more resource providers 302a, 302b, 302c (collectively, 302). Each resource provider 302 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 302 may be connected to any other resource provider 302 in the cloud computing environment 300. In some implementations, the resource providers 302 may be connected over a computer network 308. Each resource provider 302 may be connected to one or more computing device 304a, 304b, 304c (collectively, 304), over the computer network 308.

The cloud computing environment 300 may include a resource manager 306. The resource manager 306 may be connected to the resource providers 302 and the computing devices 304 over the computer network 308. In some implementations, the resource manager 306 may facilitate the provision of computing resources by one or more resource providers 302 to one or more computing devices 304. The resource manager 306 may receive a request for a computing resource from a particular computing device 304. The resource manager 306 may identify one or more resource providers 302 capable of providing the computing resource requested by the computing device 304. The resource manager 306 may select a resource provider 302 to provide the computing resource. The resource manager 306 may facilitate a connection between the resource provider 302 and a particular computing device 304. In some implementations, the resource manager 306 may establish a connection between a particular resource provider 302 and a particular computing device 304. In some implementations, the resource manager 306 may redirect a particular computing device 304 to a particular resource provider 302 with the requested computing resource.

Figure 4:
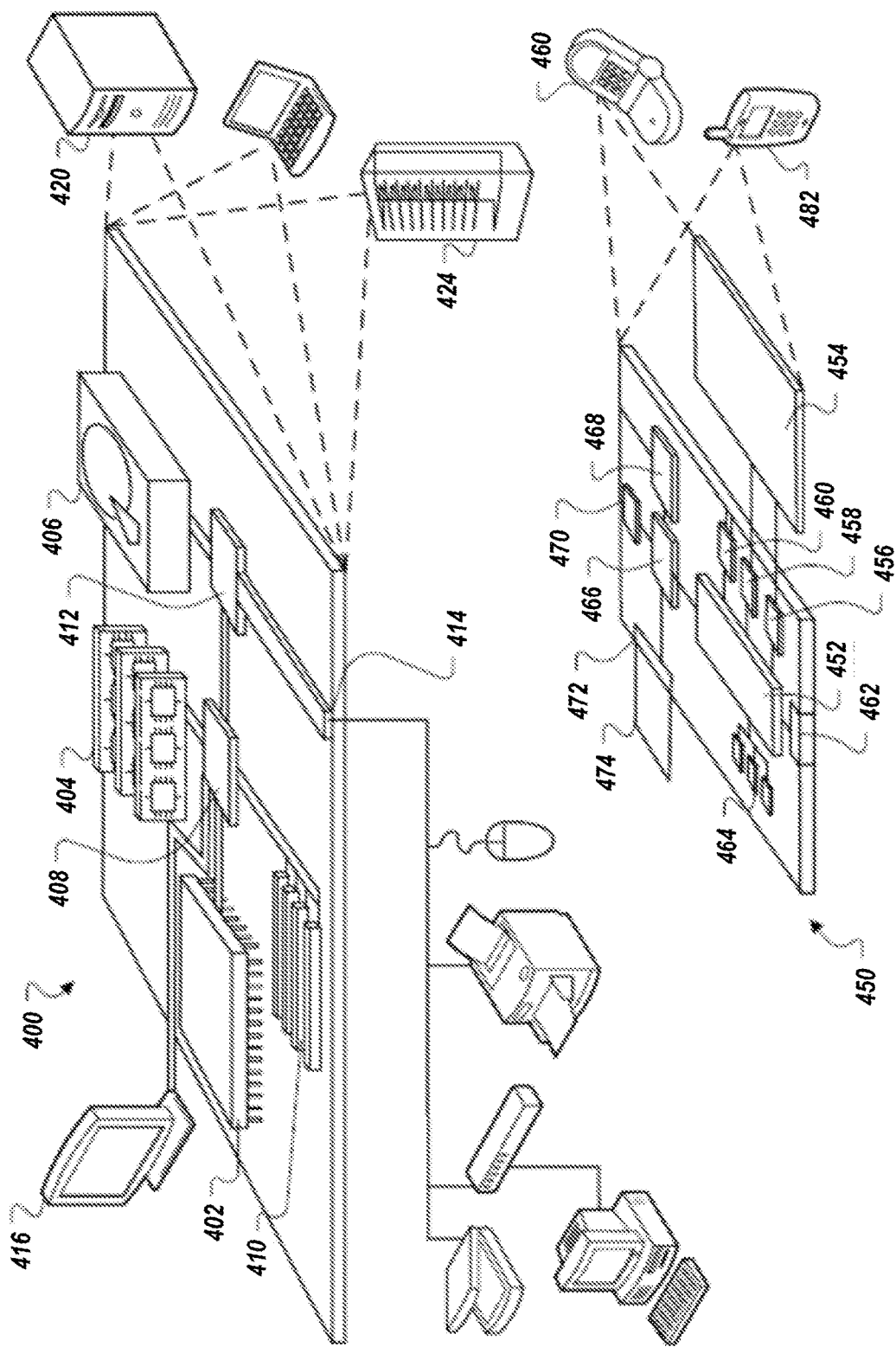
FIG. 4 is a block diagram of a computing device and a mobile computing device.

FIG. 4 shows an example of a computing device 400 and a mobile computing device 450 that can be used to implement the techniques described in this disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402 (i.e., one or more processors), a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth®, Wi-Fi™, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480.

It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for providing a wellness rider are provided. Having described certain implementations of methods and apparatus for supporting wellness rider, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

What is claimed is:

1. A method of implementing dynamic billing for a life insurance policy, the method comprising:
   automatically adjusting billed premiums of a life insurance policy on an ongoing basis to maintain client-specific coverage objectives by:
   receiving, by a processor of a computing device, from a processor of a point of sale computing device, a plurality of dynamic billing objectives wherein the dynamic billing objectives comprise at least one member selected from the group consisting of: assumptions, actual policy performance, current crediting rates, and one or more on-file policy illustration objectives specified by the policy owner;
   generating, by the processor of the computing device, a unique identifier associated with a life insurance policy and associating the unique identifier with the plurality of dynamic billing objectives;
   storing, by the processor of the computing device, in a database accessible by an illustration system and an administrative system, the dynamic billing objectives;
   receiving, by a processor of the illustration system, from a processor of an administration system, current policy in-force values associated with the life insurance policy;
   querying, by the processor of the illustration system, the database for one or more dynamic billing objectives using the unique identifier associated with the life insurance policy;
   calculating, by the processor of the illustration system, a recalculated premium value based at least in part on the current policy in-force value and the actual policy performance, wherein the actual policy performance comprises at least three members selected from the group consisting of interest credits, wellness statuses achieved, policy charges, policy credits, timing of premiums paid, amount of premiums paid, fund performance, premium payments, rider terminations, distributions, death benefit increase, and death benefit decrease;
   providing, to the processor of the administration system, the recalculated premium value; and
   overwriting, by the processor of the administration system, in a database associated with the administration system, a planned premium value with the recalculated premium value.

2. The method of claim 1, wherein the current policy in-force values comprise a wellness status.

3. The method of claim 1, wherein actual policy performance comprises at least one member selected from the group consisting of interest credits and premium payments.

4. The method of claim 1, wherein the one or more on-file policy illustration objectives specified by a policy owner comprise at least one member selected from the group consisting of: desired premium duration, target cash value, target cash value year, crediting rate, death benefit option, contractual changes, distributions, non-guaranteed elements, and any other illustrated policy goals.

5. The method of claim 1, comprising:
accessing, by the processor of the computing device, the one or more on-file policy illustration objectives on a regular and/or ad-hoc basis and providing one or more updates to a policyholder.

6. The method of claim 5, wherein the one or more updates are provided online, by mail, by email, and/or by a digital portal that can be accessed by the customer.

7. The method of claim 5, wherein the one or more updates comprise at least one of a policy statement, a bill, and a notice.

8. The method of claim 1, wherein the one or more on-file policy illustration objectives comprise at least one of:
pay premiums for n years to maintain coverage for lifetime, achieve a specified Policy Value at a specified year, and withdraw a specified amount of Policy Value at for a specified time period.

9. The method of claim 1, wherein the assumptions comprise at least one of:
number of years to pay premium, amount of premium payments, assumed policy interest rate, assumed equity return, assumed loan rate, assumed scale of insurance charges, contractual changes, distributions, non-guaranteed elements, and status used to determine size of wellness or other policy credit.

10. The method of claim 5, wherein the one or more updates comprise at least one of: an indication of how the policy is tracking toward the plurality of objectives based on the most current policy information and updated assumptions for the future, and actions the policyholder can take to remain on track with their insurance goals.

* * * * *